US011796321B2

United States Patent
Glatfelter et al.

(10) Patent No.: US 11,796,321 B2
(45) Date of Patent: Oct. 24, 2023

(54) SYSTEM FOR POD-BASED TRANSPORTATION

(71) Applicant: The Boeing Company, Chicago, IL (US)

(72) Inventors: John William Glatfelter, Kennett Square, PA (US); Brian Dale Laughlin, Wichita, KS (US)

(73) Assignee: THE BOEING COMPANY, Arlington, VA (US)

( * ) Notice: Subject to any disclaimer, the term of this patent is extended or adjusted under 35 U.S.C. 154(b) by 180 days.

(21) Appl. No.: 16/444,526

(22) Filed: Jun. 18, 2019

(65) Prior Publication Data

US 2020/0400437 A1  Dec. 24, 2020

(51) Int. Cl.
G01C 21/26 (2006.01)
G01C 21/36 (2006.01)
G08G 5/00 (2006.01)
H04W 4/029 (2018.01)
G05D 1/02 (2020.01)
H04W 4/42 (2018.01)

(52) U.S. Cl.
CPC ....... *G01C 21/265* (2013.01); *G01C 21/3605* (2013.01); *G05D 1/0202* (2013.01); *G05D 1/0212* (2013.01); *G08G 5/0013* (2013.01); *H04W 4/029* (2018.02); *H04W 4/42* (2018.02)

(58) Field of Classification Search
CPC ... G01C 21/265; G01C 21/3605; H04W 4/42; H04W 4/029; G05D 1/0202; G05D 1/0212; G08G 5/0013
See application file for complete search history.

(56) References Cited

U.S. PATENT DOCUMENTS 2,388,380 A  11/1945  Bathurst
2,462,462 A   2/1949  Boggs et al.
(Continued)

FOREIGN PATENT DOCUMENTS

KR  102119424 B1  6/2020
RU     144783 U1  8/2014
(Continued)

OTHER PUBLICATIONS

Kristin Tablang, "This Intriguing Aircraft Concept Aims to Eliminate Airport Lines and Terminals", ForbesLife, Jul. 12, 2016, 04:03pm EDT, available at https://www.forbes.com/sites/kristintablang/2016/07/12/clip-air-concept-ecole-polytechnique-federale-de-lausanne-switzerland/?sh=7421b65a2283 (Year: 2016).*
(Continued)

*Primary Examiner* — Maceeh Anwari
*Assistant Examiner* — Charles Pall
(74) *Attorney, Agent, or Firm* — COATS & BENNETT, PLLC

(57) ABSTRACT

A system and method to transport one or more persons or objects. The system includes pods that each have an interior space to house the one or more persons or objects, and vehicles that are each configured to individually connect to one or more of the pods and to transport the pods from a first location to a second location. A server is located remotely from the pods and the vehicles. The server is configured to receive data from the pods and the vehicles through a wireless communication network to monitor a usage and location of the pods.

20 Claims, 16 Drawing Sheets

(56) References Cited

U.S. PATENT DOCUMENTS

| | | |
|---|---|---|
| 2,562,491 A | 7/1951 | Hall |
| 3,101,919 A | 8/1963 | Madon |
| 3,291,242 A | 12/1966 | Tinajero |
| 3,423,121 A | 1/1969 | Lipkin |
| 3,605,935 A | 9/1971 | Gilbert |
| 3,767,253 A | 10/1973 | Kluetsch |
| 4,143,841 A | 3/1979 | Roeder |
| 4,358,072 A | 11/1982 | Williamson |
| 4,664,340 A | 5/1987 | Jackson |
| 4,676,545 A | 6/1987 | Bonfilio et al. |
| 4,699,336 A | 10/1987 | Diamond |
| 4,890,083 A | 12/1989 | Trenkler et al. |
| 5,065,162 A | 11/1991 | Akaba et al. |
| 6,059,058 A | 5/2000 | Dower |
| 6,392,538 B1 | 5/2002 | Shere |
| 6,494,404 B1 | 12/2002 | Meyer |
| 6,682,017 B1 | 1/2004 | Giannakopoulos |
| 7,344,109 B1 | 3/2008 | Rezai |
| 7,946,530 B1 | 5/2011 | Talmage, Jr. |
| 9,322,897 B1 | 4/2016 | Hoffman et al. |
| 10,207,805 B2 | 2/2019 | Evans |
| 10,303,171 B1* | 5/2019 | Brady ............... G08G 1/202 |
| 10,545,509 B1* | 1/2020 | Jessen ............. B62D 63/025 |
| 10,870,479 B2 | 12/2020 | Courtin |
| 11,167,848 B2 | 11/2021 | Duffy et al. |
| 11,548,335 B2 | 1/2023 | Stadler |
| 2002/0172571 A1 | 11/2002 | Lawrence |
| 2005/0247824 A1* | 11/2005 | Allison ................ B64F 1/31 244/137.2 |
| 2006/0079291 A1 | 4/2006 | Granovetter et al. |
| 2011/0233341 A1 | 9/2011 | Monteforte |
| 2014/0160550 A1 | 6/2014 | Brown et al. |
| 2014/0302810 A1 | 10/2014 | Inha et al. |
| 2015/0266666 A1 | 9/2015 | Wong |
| 2017/0124836 A1 | 5/2017 | Chung et al. |
| 2017/0251096 A1 | 8/2017 | Koepke |
| 2018/0086353 A1* | 3/2018 | Holbrooke ............ B61B 13/08 |
| 2018/0126871 A1 | 5/2018 | Martinotti et al. |
| 2019/0106021 A1* | 4/2019 | Dietrich .............. B60N 2/0224 |
| 2019/0271988 A1* | 9/2019 | High .................. G05D 1/0293 |
| 2020/0047692 A1* | 2/2020 | Park ..................... G01G 19/12 |
| 2020/0180765 A1* | 6/2020 | Behr ..................... B64C 1/18 |
| 2021/0183214 A1 | 6/2021 | Attariani et al. |

FOREIGN PATENT DOCUMENTS

| | | |
|---|---|---|
| RU | 2706748 C1 | 11/2019 |
| UA | 88319 U | 3/2014 |

OTHER PUBLICATIONS

Kristin Tablang, "This Intriguing Aircraft Concept Aims to Eliminate Airport Lines and Terminals", ForbesLife, Jul. 12, 2016, 04:03pm EDT, available at</i> https://www.forbes.com/sites/kristintablang/2016/07/12/clip-air-concept-ecole-polytechnique-federale-de-lausanne-switzerland/?sh=7421b65a2283 (Year: 2016).*

Tucker, P., Why Your Plane Can't Have An Escape Pod, Defense One, Nov. 24, 2015, Retrieved from the internet: URL: https://www.defenseone.com/technology/2015/11/why-your-plane-cant-have-escape-pod/123989/ [retrieved on Jul. 31, 2020], pp. 1-5.

Star Wars, Escape Pod, Retrieved from the internet: URL: https://www.starwars.com/databank/escape-pod [retrieved on Jul. 31, 2020], pp. 1-4.

\* cited by examiner

SYSTEM FOR POD-BASED TRANSPORTATION

TECHNOLOGICAL FIELD

The present disclosure relates generally to the field of transportation and, more specifically, to transporting one or more persons and/or objects with a pod and associated network.

BACKGROUND

Much of a traveler's time is spent moving from one environment to another. For example, a business traveler that travels from their office to a business meeting in a remote city moves through a number of different environments. This can initially include a first vehicle such as a car or public transportation vehicle to travel from their office to the airport. This can also include the interior of the airport while moving through security and waiting at the airline gate. Another environment includes the one or more aircraft used for traveling to the city where the meeting is located. This can then also include another transportation vehicle to travel from the airport to the meeting.

The traveler is required to physically move into and out of each of these environments during their trip. This includes getting into an out of vehicles, sitting in waiting areas, sitting on the aircraft, moving through security, etc. Further, the traveler is required to closely monitor the time to ensure they are at the correct location at the correct time. This movement and monitoring of time makes it difficult for the traveler to be productive. Further, the required effort can be exhausting to the traveler.

SUMMARY

One aspect is directed to a system to monitor transportation of one or more persons or objects. The system includes pods that each has an interior space to house the one or more persons or objects. The system includes vehicles that are each configured to individually connect to one or more of the pods and to transport the pods from a first location to a second location. At least one of the vehicles is configured to transport the pods by land and at least one of the vehicles configured to transport the pods by air. A server is located remotely from the pods and the vehicles. The server is configured to receive data from the pods and the vehicles through a wireless communication network to monitor a usage and location of the pods.

In another aspect, each of the pods includes wall segments that extend around and enclose the interior space and wherein each of the vehicles includes an interior pod section that extends around and encloses the one or more pods.

In another aspect, a first one of the vehicles includes wheels that are driven by an engine or propulsion system to transport the pod over land and a second one of the vehicles includes an aircraft engine and wings to transport the pod through the air.

In another aspect, the server includes: a communication interface configured to receive the data from the pods and the vehicles transmitted through the wireless communication network; a memory circuit configured to store information about the pods; and a processing circuit configured to monitor the usage and location of the pods.

In another aspect, the server calculates an expected time of arrival to a destination location for the pods that are being transported by one of the vehicles.

In another aspect, the server is configured to calculate a travel plan for each of the pods that each includes a travel path that extends between the first and second locations, the travel plan being calculated prior to departure from the first location.

In another aspect, the server is configured to monitor the movement of the pods along the travel paths, and adjust the travel plan of one or more of the pods when the monitor server calculates that two or more of the pods are scheduled to pass within a predetermined distance of each other.

In another aspect, each of the pods includes: one or more sensors that detect a geographic location of the pod; and a communications circuit configured to wirelessly transmit the location of the pod to the server.

One aspect is directed to a system to monitor transportation of one or more persons or objects. The system includes pods that each has an interior space to house the one or more persons or objects. The system includes vehicles that are configured to individually connect to one or more of the pods and to transport the pods from a first location to a second location. A server is located remotely from the pods and the vehicles and configured to receive data from the pods and vehicles through a wireless communication network. The server includes: a communication interface that receives the data from the pods and the vehicles transmitted through the wireless communication network; and a processing circuit that monitors the location of the pods and the one or more persons or objects.

In another aspect, the processing circuit is configured to maintain transportation preferences for each of the one or more persons, and for each of the one or more persons schedule transportation with one of the pods according to the transportation preferences.

In another aspect, the transportation preferences include a desired arrangement of the interior space of the pod.

One aspect is directed to a method of transporting one or more persons or objects. The method includes: monitoring a location of pods that each comprise an interior space; monitoring a location of vehicles that are each configured to individually connect to one or more of the pods and to transport the pods; receiving a request to transport a first one of the persons or objects from a first location to a remote second location; assigning one of the pods to transport the first one of the persons or objects; scheduling a first one of the vehicles to transport the pod from the first location to an intermediate location when the first one of the persons or objects is within the pod; and scheduling a second one of the vehicles to transport the pod from the intermediate location to the second location when the first one of the persons or objects is within the pod.

In another aspect, the method includes determining a travel preference of the first one of the persons or objects and arranging the interior space of the pod to meet the travel preference.

In another aspect, the method includes: calculating a travel path for the one of the pods that extends between the first location, the intermediate location, and the second location, the travel path being calculated prior to the departure from the first location; monitoring a location of the pod during the travel; determining an event related to the travel path while the pod is being transported between the first and second locations; and in response to determining the event, adjusting the travel path of the one of the pods establishing an account for the first one of the persons prior to receiving the request to transports the first one of the persons or objects, the account comprising at least a name and address of the first one of the persons.

In another aspect, determining the event related to the travel path includes determining traffic along the travel path and adjusting the travel path in response to the traffic.

In another aspect, the method includes calculating a travel path for the one of the pods that extends between the first location, the intermediate location, and the second location, and accessing a map through a wireless communication network and integrating the travel path with the map.

In another aspect, the method includes receiving a request to transport a second one of the persons or objects from the first location to the second location; assigning the pod to transport the second one of the persons or objects, and concurrently transporting both the first and second ones of the persons or objects in the pod from the first location to the second location.

In another aspect, the method includes updating a database that includes of current and future movements of the pods and the vehicles travel schedules for the first one of the persons or objects prior to assigning the pod to transport the second one of the persons or objects.

In another aspect, the method includes using a first mode of transportation to transport the pod from the first location to the intermediate location and using a different second mode of transportation to transport the pod from the intermediate location to the second location.

In another aspect, the method includes: calculating a travel plan that includes a travel path of an expected route from the first location to the second location prior to the pod departing from the first location; monitoring a position of the pod during the travel and comparing the position with the travel path; and notifying a remote entity when a difference between the position and the travel path exceeds a predetermined amount.

The features, functions and advantages that have been discussed can be achieved independently in various aspects or may be combined in yet other aspects, further details of which can be seen with reference to the following description and the drawings.

DETAILED DESCRIPTION

Figure 1:
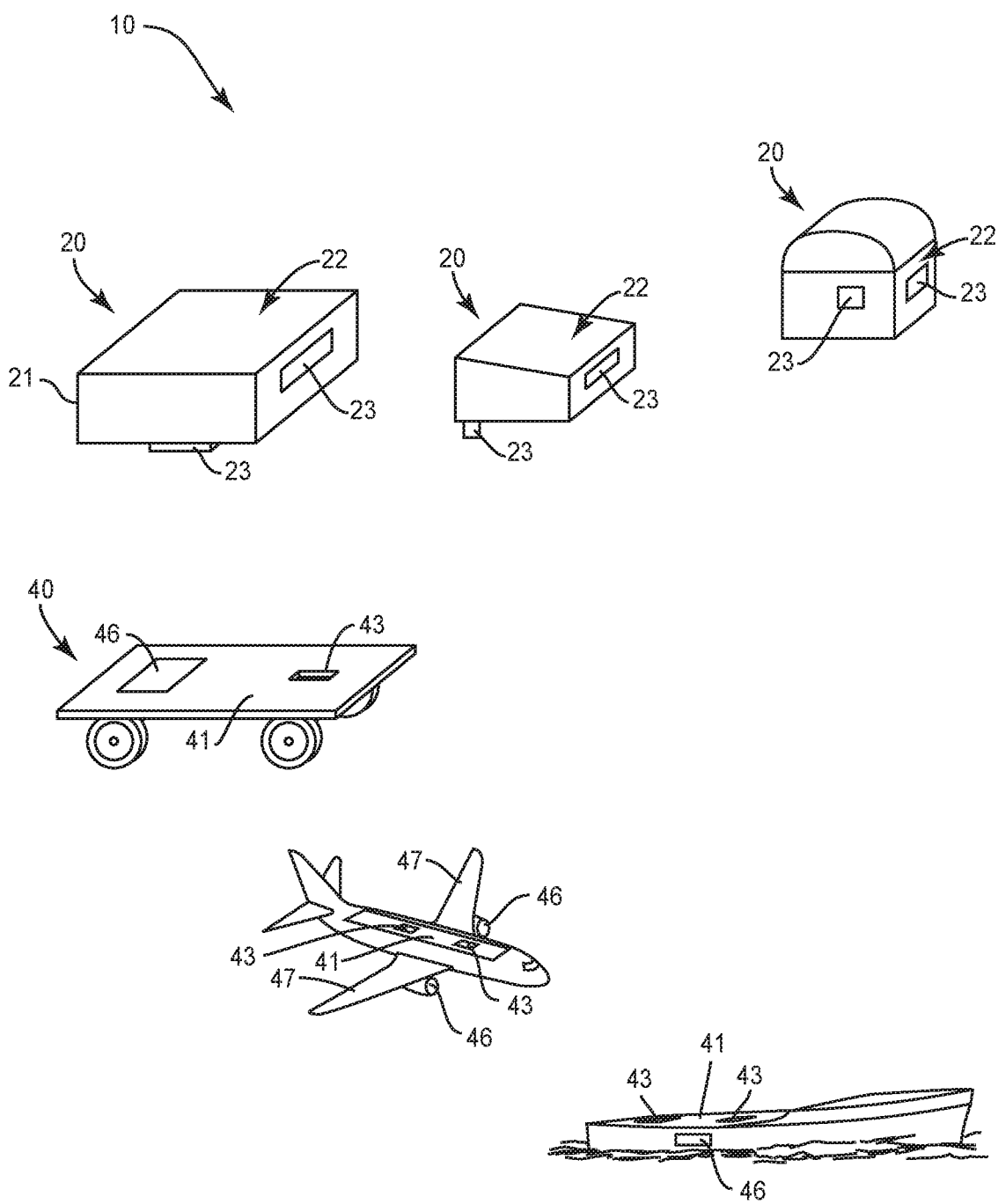
FIG. 1 is a schematic diagram of a pod-based system for transporting one or more persons and/or objects.

FIG. 1 illustrates pods 20 and vehicles 40 configured to transport one or more travelers and/or objects. The pods 20 include an interior space 22 configured to house the one or more travelers and/or objects. The pods 20 can be attached to and transported by multiple different vehicles 40. The different vehicles 40 can provide for different modes of transportation. Modes of transportation include but are not limited to ground travel, air travel, water travel, and rail travel (e.g., train). During use, one or more travelers and/or objects are housed within the pod 20. The pod 20 is attached to and transported by one or more vehicles 40 during the travel. For example, the pod 20 can be initially connected to and transported by a land-based vehicle 40 for transportation to an airport. The pod 20 can then be connected to and transported by an air-based vehicle 40 for transportation to a remote destination. During the travel with the two separate vehicles 40, the travelers and/or objects remain within the pod 20 with little to no interruptions that would otherwise occur during the travel.

Figure 2:
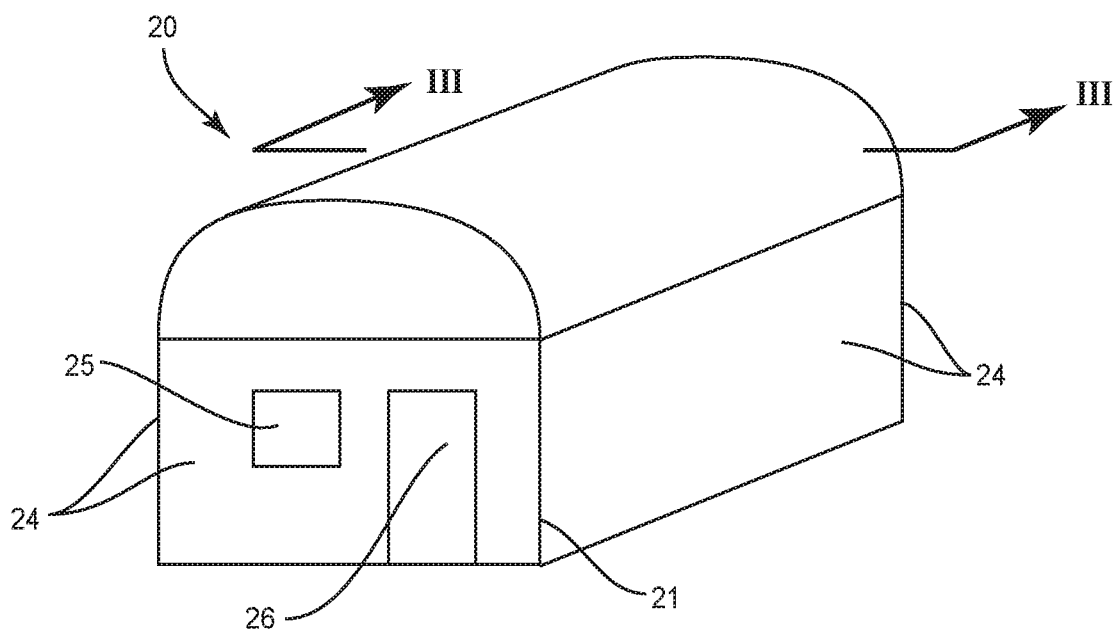
FIG. 2 is a perspective view of a pod.

FIG. 2 illustrates a pod 20 that includes a frame 21 that extends around and forms the interior space 22. The frame 21 includes one or more wall segments 24 that can be configured in various shapes and sizes. One or more of the wall segments 24 can be opaque to provide for privacy within the interior space 22. One or more of the wall segments 24 can be translucent to allow light from the exterior to enter into the interior space 22. One or more windows 25 can extend through one or more of the wall segments 24 to allow the travelers to view their environment during travel. One or more doors 26 provide for access into and out of the interior space 22. The windows 25 and doors 26 can be configured to be closed or opened during travel. For example, the windows 25 can be opened to provide air into the interior space 22 during travel on the ocean, and closed during air travel.

Figure 3:
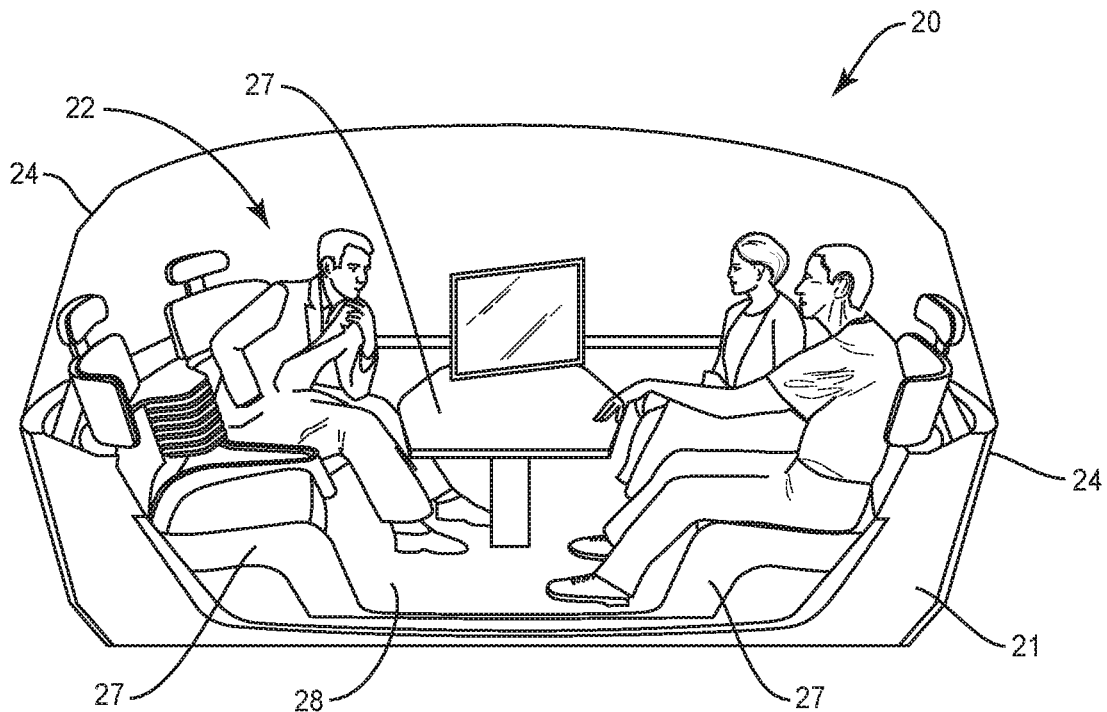
FIG. 3 is a section view cut along line of FIG. 2.

FIG. 3 illustrates an interior space 22 of a pod 20 configured as a meeting space. Furniture 27 such as chairs, tables, bookshelves, cabinets, and couches are positioned to facilitate the meeting. In one example, the furniture 27 is secured to the floor 28. This provides for the furniture 27 to remain upright during movement of the pod 20. This movement can be caused by various forces, such as but not limited to turbulence during flight or rail travel, wave motion during sea travel, vibrations during land travel, or movement of the pod 20 from one vehicle 40 to another. In one example, some of the furniture 27 remains unattached and are freely movable by the travelers around the interior space 22.

The interior space 22 is designed to facilitate the traveler's needs during travel. This can include but is not limited the interior space 22 arranged as a meeting space during business travel, a bedroom for overnight travel, various general seating arrangements for business and social travel, an office with one or more desks, a theater arrangement to watch movies during travel, and various other arrangements. The interior space 22 can be arranged to accommodate a single traveler, or two or more travelers that may or may not know each other.

Figure 4:
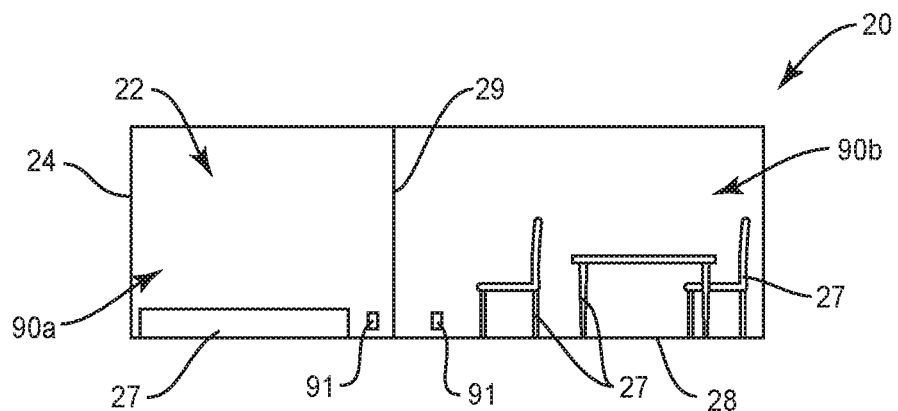
FIG. 4 is a side schematic view of an interior space of a pod.

One or more partitions 29 can be mounted to divide the interior space 22 into separate compartments 90. FIG. 4 includes a partition 29 dividing the interior space 22 into a first compartment 90a with the furniture 27 including a bed for sleeping, and a second compartment 90b with furniture including chairs and a table. The partition 29 can be configured to attach to mounts in one or more of the wall segments 24 (such as a floor 28 and lateral walls). This provides for the partition 29 to be moved and situated as needed.

Figure 5:
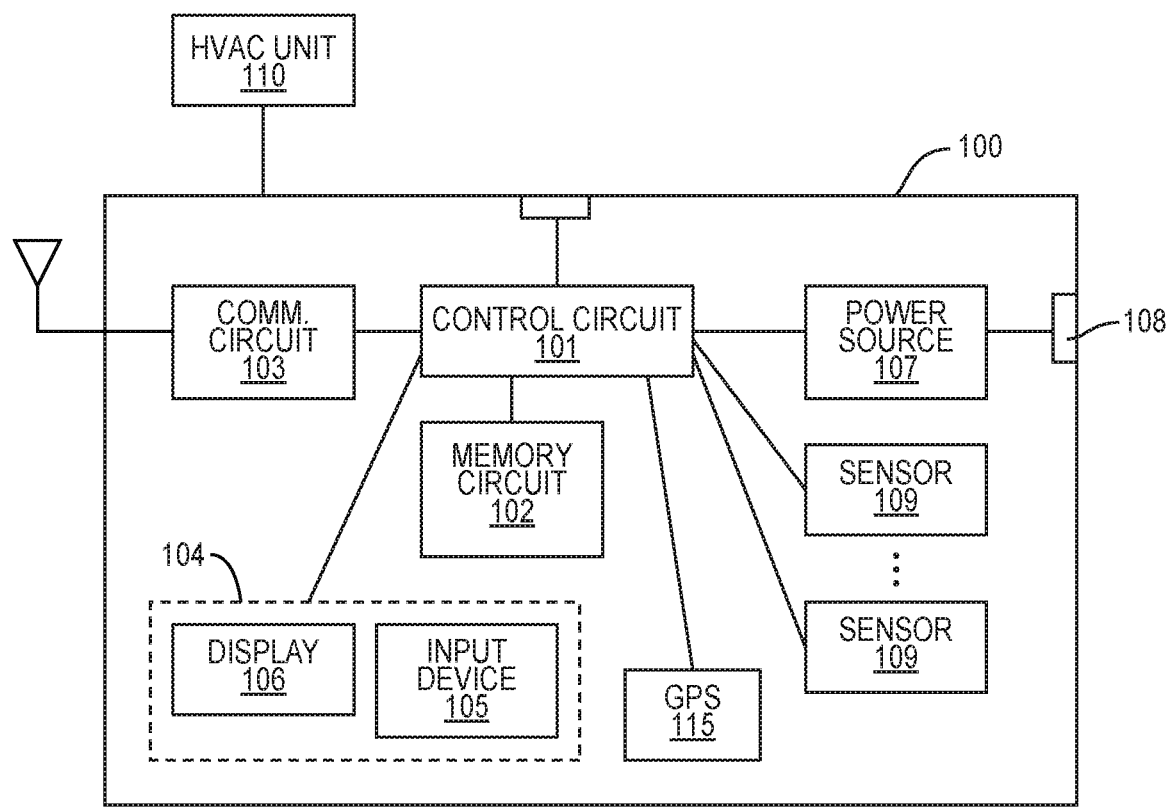
FIG. 5 is a schematic diagram of a control unit of a pod.

The pod 20 includes a control unit 100 as illustrated in FIG. 5. The control unit 100 includes a control circuit 101 and a memory circuit 102. The control circuit 101 controls overall operation of the pod 20 according to program instructions stored in the memory circuit 102. The control circuit 101 can include one or more circuits, microcontrollers, microprocessors, hardware, or a combination thereof. Memory circuit 102 includes a non-transitory computer readable storage medium storing program instructions, such as a computer program product, that configures the control circuit 101 to implement one or more of the techniques discussed herein. Memory circuit 102 can include various memory devices such as, for example, read-only memory, and flash memory. Memory circuit 102 can be a separate component as illustrated in FIG. 5, or can be incorporated with the control circuit 101. Alternatively, the control circuit 101 may omit the memory circuit 102, e.g., according to at least some embodiments in which the control circuit 101 is dedicated and non-programmable.

The control unit 100 is configured to provide for communication functionality for the one or more travelers in the pod 20. Communications can include both incoming and outgoing communications. A communications circuit 103 provides for this communication functionality. The communications circuit 103 enables communication between devices used by the travelers and remote entities over a wireless communication network 170 (see FIG. 12). The communications circuit 103 can also include one or more devices mounted in the interior space 22 that provide for communications with the remote entities. For example, a wired transmitter and receiver can be mounted in the interior space 22 for use by the one or more travelers.

The communications circuit 103 can include one or more interfaces that provide for different methods of communication. The communications circuit 103 can include a cellular interface that enables communication with a mobile communication network (e.g., a WCDMA, LTE, or WiMAX network). The communications circuit 103 can include a WLAN interface configured to communicate with a local area network, e.g., via a wireless access point. An exemplary WLAN interface could operate according to the 802.11 family of standards, which is commonly known as a WiFi interface. The communications circuit 103 can further include a personal area network interface, such as a Bluetooth interface. The communications circuit 103 can also include a Near Field Communication interface that provides for short-range wireless connectivity technology that uses magnetic field induction to permit devices to share information with each other over short distances.

In one example as illustrated in FIG. 5, the communications circuit 103 is incorporated into the control unit 100. In another example, the communications circuit 103 is a separate system that is operatively connected to and controlled by the control unit 100.

A user interface 104 provides for a traveler in the pod 20 to control one or more aspects of the pod 20. The user interface 104 can include one or more input devices 105 such as but not limited to a keypad, touchpad, roller ball, and joystick. The one or more input devices 105 provide for the travelers to enter commands to the control circuit 101. The user interface 104 can also include one or more displays 106 for displaying information to the traveler. The user interface 104 can be positioned within the interior space 22 to be accessible to the travelers during travel.

One or more sensors 109 detect one or more conditions at the pod 20. Aspects that can be detected by the sensors 109 include but are not limited to a temperature within the interior space 22, the position of a door 26 of the pod 20 (i.e., open or closed), and whether the pod 20 is connected to a vehicle 40.

A power source 107 provides power to the control unit 100. The power source 107 can include various configurations, including but not limited to batteries. The power source 107 can also provide power to various components that are within the interior space 22, such as a television or lights. One or more outlets 91 (see FIG. 4) can be positioned in the interior space 22 to supply power to the travelers own components (e.g., laptop computer, phone charger).

One or more solar panels can be mounted on the exterior of the pod 20 and provide recharging to the power source 107. The power source 107 can include a connector 108 to provide a hardwire connection to an external power source (e.g., electrical power from the building in which the pod 20 10 is housed). FIG. 5 includes the power source 107 incorporated with the control unit 100. In another example, the power source 107 can be separate from the control unit 100 and configured to provide power to the control unit 100.

The pod 20 can also include a heating and air conditioning unit (HVAC) 110 to control the air temperature within the interior space 22. The HVAC system 110 can include one or more heating units and cooling units. One or more ducts 111 (see FIG. 4) can extend from the HVAC unit 110 to distribute the conditioned air to the interior space 22. The HVAC unit 110 can be controlled by the control unit 100 and adjusted based on commands entered by the travelers.

A sensor 115, such as a global positioning system (GPS) component receives coordinate information from various sources (e.g., satellites, base stations) to determine a geographic position of the pod 20. In another example, the geographic position of the pod 20 is received from the connected vehicle 40.

Figure 6:
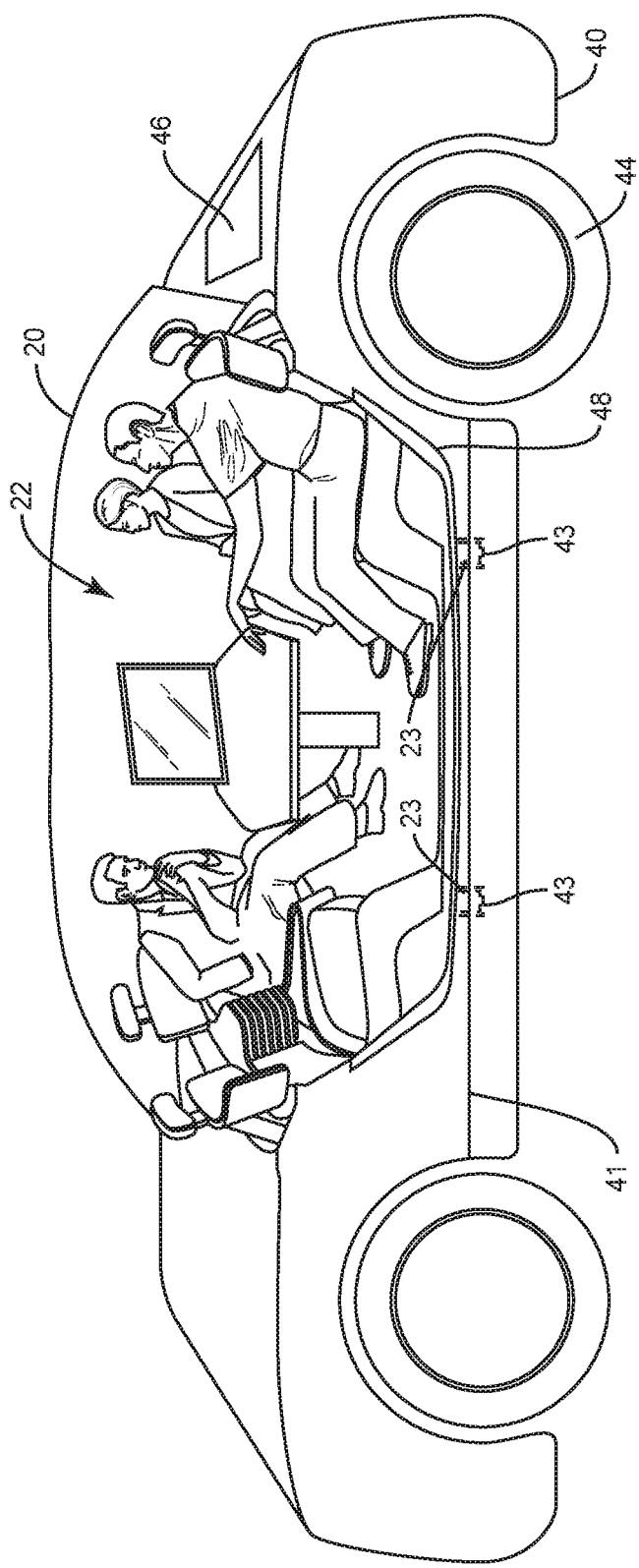
FIG. 6 is a perspective view of a vehicle with a partial cut-away to view an interior space of a pod connected to a vehicle.

Various different types of vehicles 40 can connect to and transport the pod 20. One type of vehicle 40 is configured to transport the pod 20 over land. FIG. 6 illustrates an example of a land-based pod 20 that includes a base 41 that supports the pod 20. The base 41 includes a receptacle 48 that receives the pod 20. The vehicle 40 can also include one or more wheels 44 that are driven by an engine 46 for transportation over land. One or more connectors 43 can be positioned at the base 41 to connect to the pod 20. The connectors 43 can provide for a mechanical connection to prevent detachment when the vehicle 40 is transporting the pod 20.

Figure 7:
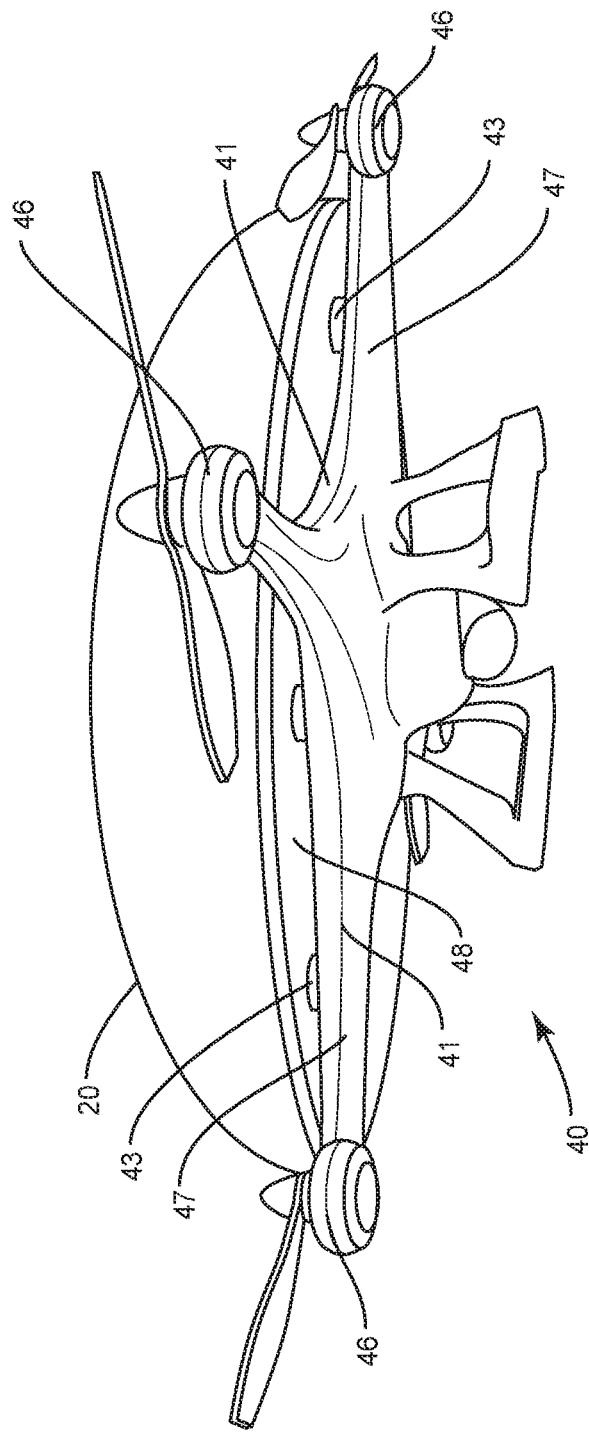
FIG. 7 is a perspective view of a pod connected to a vehicle.

FIG. 7 illustrates a vehicle 40 that provides for air transportation of a pod 20. The vehicle 40 includes a base 41 with a receptacle 48 that receives the pod 20. One or more connectors 43 connect the pod 20 to the base 41. The vehicle 40 also includes wings 47 and engines 46 that provide for flight. A control position 49, such as a cockpit, provides for a pilot to control the transportation. Other vehicles 40 can provide for autonomous transportation and thus may not include a control position 49. In the various vehicles 40, one or more of the engines 46 can include a propulsion system.

Figure 8:
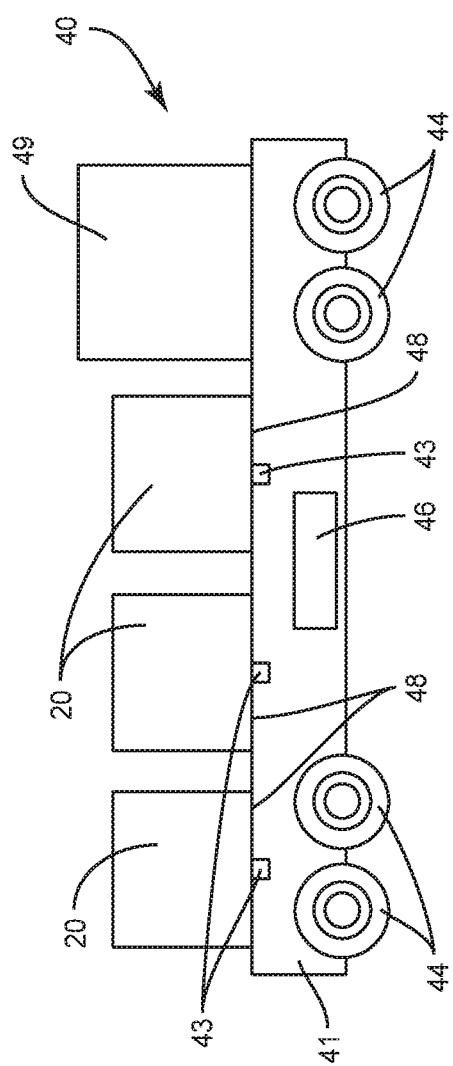
FIG. 8 is a side schematic view of multiple pods connected to a vehicle.

The vehicles 40 can be configured to transport a single pod 20, such as the examples of FIGS. 6 and 7. The vehicles 40 can also be configured to transport multiple pods 20. FIG. 8 includes a vehicle 40 with an elongated base 41 having multiple receptacles 48. One or more connectors 43 are positioned at each receptacle 48 to connect the pods 20 to the vehicle 40. The vehicle 40 also includes an engine 46 that drives one or more of the wheels 44 for transportation over land. A control position 49 provides a location for a driver to operate the vehicle 40.

Figure 9:
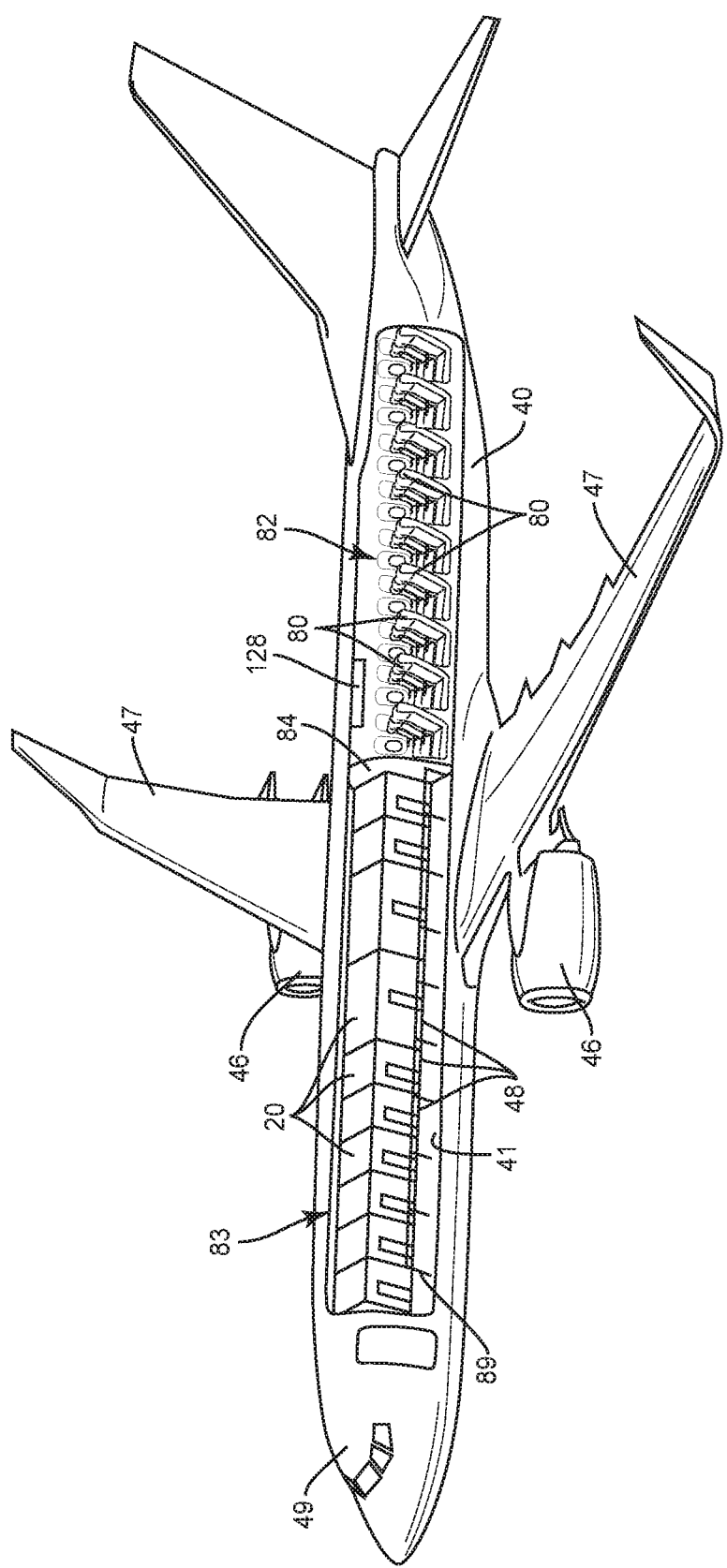
FIG. 9 is a perspective view of a vehicle with a partial cut-away to view an interior space of the vehicle.

FIG. 9 illustrates a vehicle 40 configured as an aircraft for flight. The vehicle 40 includes a base 41 and wings 47 with one or more engines 46 equipped for flight. The vehicle 40 also includes multiple receptacles 48 each configured to receive one or more pods 20. A control position 49 that includes a cockpit is positioned at the front of the vehicle 40 and includes controls for one or more pilots to control the vehicle 40. The vehicle 40 is equipped with an interior pod section 83 to transport the pods 20. In one design, the pod section 83 is pressurized to allow travelers to exit the pod 20 during flight (such as to use restrooms or a lounge). The vehicle 40 can also include a cabin 82 with one or more seats 80 for transporting persons. The cabin 82 can also include one or more lavatories and a galley. The relative sizes of the pod section 83 and the cabin 82 can vary. FIG. 9 includes an example in which each occupies roughly one-half of the area of the vehicle 40. Other examples can include the cabin 82 and section 83 having various relative dimensions.

Figure 10:
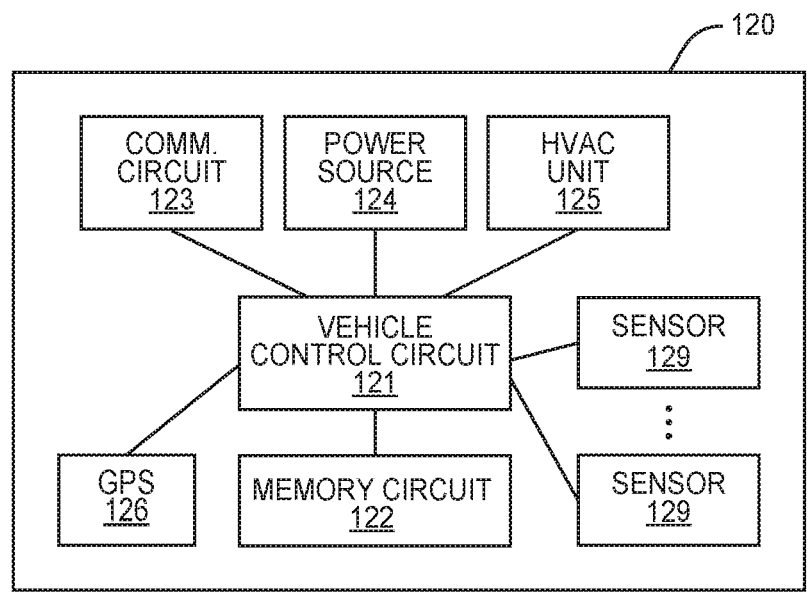
FIG. 10 is a schematic diagram of a control unit of a vehicle.

A vehicle control unit 120 can control one or more operations of the vehicle 40. As illustrated in FIG. 10, the control unit 120 includes a control circuit 121 and a memory circuit 122. The control circuit 121 controls one or more operations of the vehicle 40 according to program instructions stored in the memory circuit 122. The control circuit 101 can include one or more circuits, microcontrollers, microprocessors, hardware, or a combination thereof. Memory circuit 122 includes a non-transitory computer readable storage medium storing program instructions, such as a computer program product, that configures the control circuit 121 to implement one or more of the techniques discussed herein. Memory circuit 122 can include various memory devices such as, for example, read-only memory, and flash memory. Memory circuit 122 can be a separate component, or can be incorporated with the control circuit 121.

A communications circuit 123 provides for communication functionality for the vehicle 40. The communications circuit 123 can include one or more interfaces that provide for different methods of communication. The communications circuit 123 can include a cellular interface that enables communication with a mobile communication network (e.g., a WCDMA, LTE, or WiMAX network). The communications circuit 123 can include a WLAN interface configured to communicate with a local area network, e.g., via a wireless access point. An exemplary WLAN interface could operate according to the 802.11 family of standards, which is commonly known as a WiFi interface. The communications circuit 123 can further include a personal area network interface, such as a Bluetooth interface. The communications circuit 123 can also include a Near Field Communication interface that provides for short-range wireless connectivity technology that uses magnetic field induction to permit devices to share information with each other over short distances. The communications circuit 123 can be incorporated into the control unit 120 as illustrated in FIG. 10, or can be a separate system that is operatively connected to and controlled by the control unit 100.

A sensor 126, such as a global positioning system (GPS) component is configured to receive coordinate information from various sources (e.g., satellites, base stations) to determine a geographic position of the vehicle 40.

One or more sensors 129 provide for detecting one or more conditions at the vehicle 40. Conditions include but are not limited to temperature within the vehicle 40, and connection of one or more pods 20.

A power source 124 provides power to the control unit 120 as well as components on the vehicle 40. The power source 124 can include various configurations, including but not limited to one or more batteries.

An HVAC unit 125 can provide conditioned air to the vehicle 40. The HVAC unit 125 can include one or more heating units and cooling units as well as one or more ducts 128 to distribute the air. The HVAC unit 125 can be incorporated with the control unit 120 as illustrated in FIG. 10, or can include a separate component that is controlled by the control unit 120.

In one example, the control unit 120 is a flight control unit that controls the operation of an aircraft 40.

The pod 20 can function as an independent unit when unattached from a vehicle 40 as well as when attached to a vehicle 40. This independence includes the control unit 100 providing one or more utility functions. For example, the control unit 100 can provide for communications to and from the pod 20 through the communications circuit 103. The control unit 100 can also provide for heating and cooling the air within the interior space 22 through the HVAC unit 110. The power source 107 can provide electrical power to the components within the interior space 22, including both these that are part of the pod 20 (e.g., lights, video equipment) and those brought into the interior space 22 by the traveler (e.g., cellphone, laptop computer).

Figure 11:
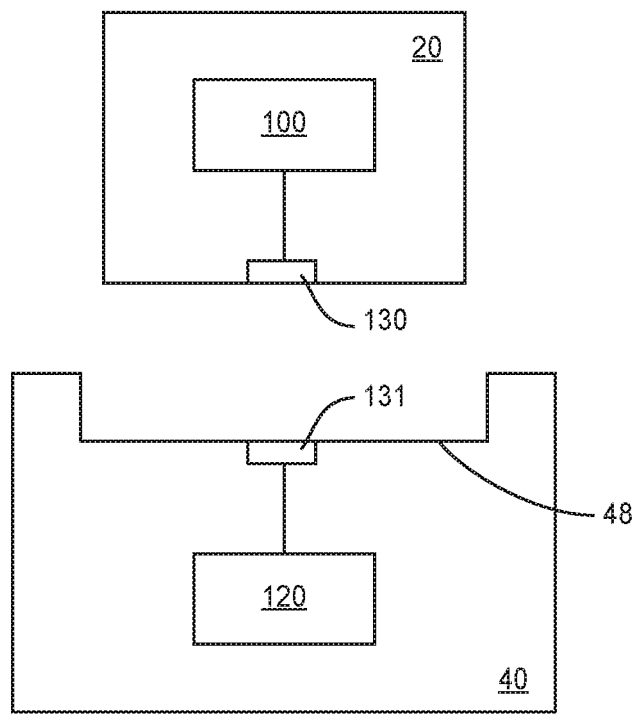
FIG. 11 is a schematic diagram of a vehicle with a receptacle configured to receive a pod.

The pod 20 can further be configured to receive one or more of the utility functions from the vehicle 40 when attached to the vehicle 40. FIG. 11 illustrates a manner by which the pod 20 can connect to and receive one or more of the utility functions from the vehicle 40. The pod 20 includes a port 130 that is connected to the pod control unit 100. Likewise, the vehicle 40 includes a port 131 that is connected to the vehicle control unit 120. When the pod 20 is connected to the vehicle 40, the ports 130, 131 engage together to provide for one or more of the utility functions to be supplied from the vehicle 40 to the pod 20.

Figure 12:
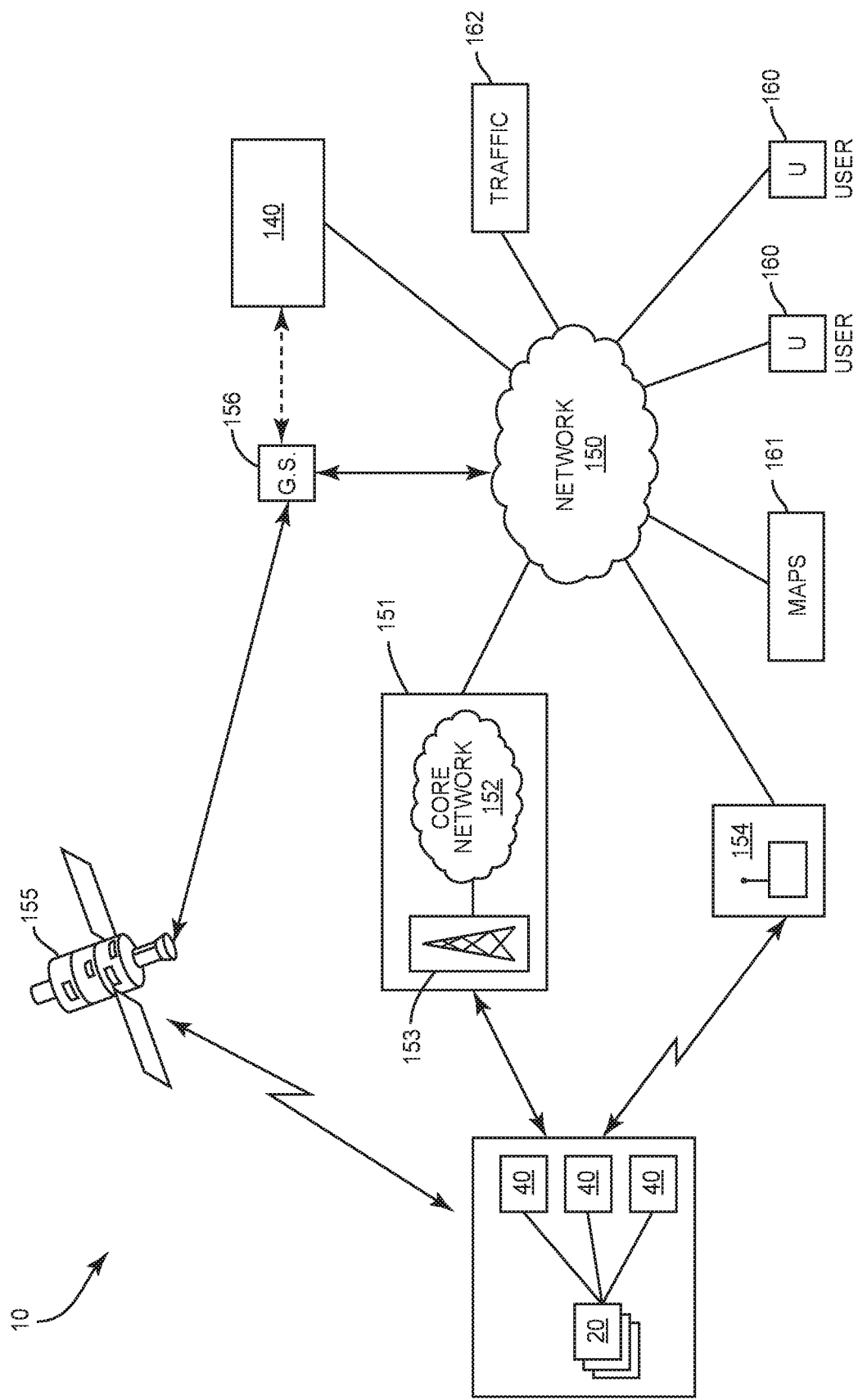
FIG. 12 is a schematic diagram of a pods and vehicles within a wireless communication network for communications with a server.

As illustrated in FIG. 12, a server 140 can monitor and communicate with the pods 20 and vehicles 40 through a wireless communications network 170. The communications circuits 103, 123 of the pods 20 and vehicles 40 respectively enable for communication with the server 140 through the wireless communications network 170 that can include a packet data network (PDN) 150. The PDN 150 can include a public network such as the Internet, or a private network.

The wireless communications network 170 can include a mobile communication network 151 (e.g., a WCDMA, LTE, or WiMAX network). The mobile communication network (MCN) 151 includes a core network 152 and a radio access network (RAN) 153 including one or more base stations. The MCN 151 can be a conventional cellular network operating according to any communication standards now known or later developed. For example, the MCN 151 can comprise a Wideband Code Division Multiple Access (WCDMA) network, a Long Term Evolution (LTE) network, or WiMAX network. The MCN 151 is further configured to access the packet data network (PDN) 55.

As further illustrated in FIG. 12, the communications circuits 103, 123 can also communicate through a Wireless Local Area Network (WLAN) 154 that operates according to the 802.11 family of standards, which is commonly known as a WiFi interface.

Communications can also be available through one or more satellites 155. The satellites can communicate to the server 140 through one or more of ground stations 156. The ground stations 156 can communicate to the server 140 through the PDN 150, or without use of the PDN 150.

Figure 13:
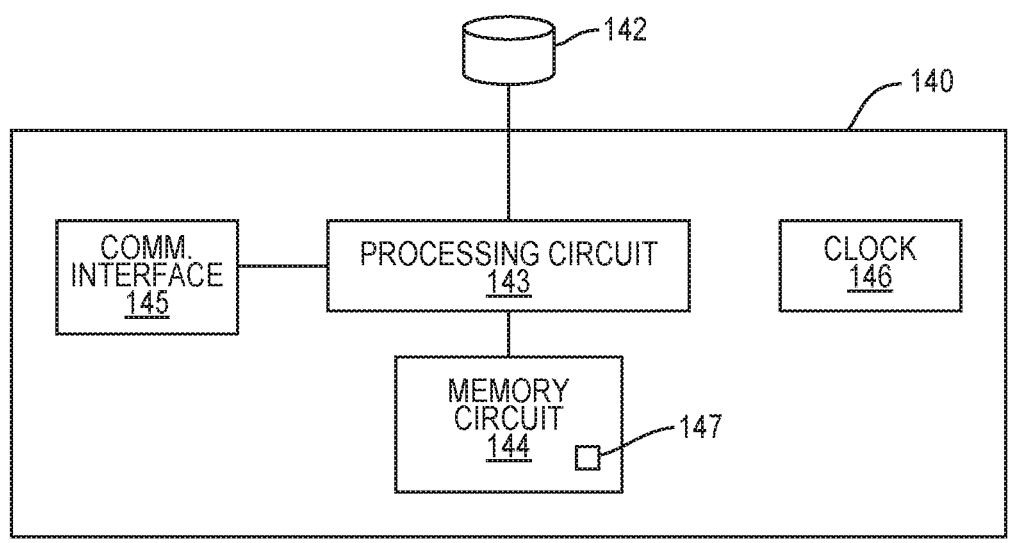
FIG. 13 is a schematic diagram of a server.

As illustrated in FIG. 13, the server 140 includes one or more processing circuits (illustrated as processing circuit 143) that may include one or more microprocessors, microcontrollers, Application Specific Integrated Circuits (ASICs), or the like, configured with appropriate software and/or firmware. A computer readable storage medium (shown as memory circuit 144) stores data and computer readable program code that configures the processing circuit 143 to implement the techniques described above. Memory circuit 144 is a non-transitory computer readable medium, and may include various memory devices such as random access memory, read-only memory, and flash memory. A communications circuit 145 connects the server 140 to the PDN 155, and can be configured to communicate with the PDN 155 according to one or more 802.11 standards. The communications circuit 145 can support a wired connection (e.g., Ethernet), a wireless connection, or both. The database 142 is stored in a non-transitory computer readable storage medium (e.g., an electronic, magnetic, optical, electromagnetic, or semiconductor system-based storage device). The database 142 can be local or remote relative to the server 140. A clock 146 can measure various timing requirements regarding the transportation of the pods 20 and vehicles 40. The clock 146 can be incorporated with the processing circuit 143, or can be a separate component independent from the processing circuit 143.

The server 140 can be configured to provide a web interface for access by one or more entities. The server 140 is configured for accessing information about the transportation using a browser-based interface or an applications program interface (API). The browser-based interface can include a website through which the contents of the database 142 can be accessible. Although the website can be hosted by the server 140, it can also be hosted at another location accessible through the PDN 150.

The server 140 stores the information about the system 10, including information about one or more of the pods 20, vehicles 40, users, and travel plans for each of the trips that can include starting and ending locations, travel paths, waypoints, expected speed, and trajectories. This information can be stored at the database 142 that can be located at the server 140 and/or can be stored at a remote location.

Entities can access the information at the server 140 through a variety of devices 160. The devices 160 can include laptop computers, personal computers, personal digital assistants, mobile computing/communication, tablet devices, and various other-like computing devices. The devices 160 can also include a body-worn device such as a watch or pendant configured to provide access. Each of the entities uses a respective device 160 and accesses the server 140 through the PDN 150, or alternatively some other network. In one embodiment, one or more of the entities can use his or her respective device 160 to access the server 140 through a separate portal. Each entity's portal can include a secure interface through which the entity can access the information that is assigned to them.

A variety of different entities through their devices 160 can have access to some or all of the information at the server 140. The entities can include a using entity that uses the system 10 for transportation of one or more persons and/or objects. Examples include but are not limited to travelers and owners of objects that are being transported. The entities can also include a supplying entity that supplies the services to the using entities. Examples include but are not limited to airlines, rail companies, trucking companies, and shipping companies. Entities can also include family members, friends, and business associates of entities that want to track the status of the transportation. Entities can also include security forces such as police, firefighters, and coast guard can have access to some or all of the information. Additional entities can also have access to some or all of the information depending upon the context and the need for the information.

The entities can access the information by accessing the server 140. In one example, the server 140 is configured for browser-based accessibility. The browser-based interface can support well-known browsers such as Internet Explorer and Mozilla Firefox, Safari, Chrome. Alternatively, or in conjunction the entities 60 can obtain the information using one or more APIs through their device 160.

Figure 14:
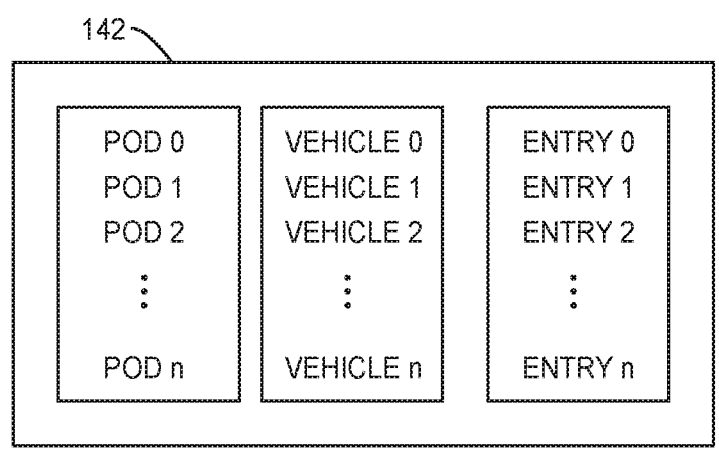
FIG. 14 is a schematic diagram of a database associated with the server.

As illustrated in FIG. 14, a wide variety of information is maintained in the database 142, including information about each pod 20 and vehicle 40. This information can be added to the database when the pod 20s and vehicles 40 are included into the system 10. For a pod 20, the information can include but is not limited to: year manufactured; current location; size (e.g., weight); current configuration; number of wall segments 24; number of partitions 29; number of travelers and/or objects that can be carried; and utility functions and specifications. For the vehicle 40, the information can include but is not limited to: year manufactured; current location; mode of transportation (e.g., land-based, air-based); number of receptacles 48; and utility functions and specifications.

Prior to using the transportation services, the using entities establish an account. The account can be established through application software that is downloaded and stored on the entity device 160. The using entity can also establish the account by accessing the website hosted by the server 140. Additionally or alternatively, the account can be created in a non-electronic fashion through contacting a person who works for the supplying entity (e.g., a call center employment who works for an airline and can establish the account).

The account includes information about each using entity. This can include basic information (e.g., name, age, date of birth) and contact information (e.g., phone number, email address, home address). The account can also include payment methods such as credit account and bank numbers through which the transportation will be billed. The account can also include travel preferences, such as but not limited to preferred mode of travel (e.g., air, land, water), preferred time of travel (e.g., morning, evening), and whether it is acceptable to share a pod 20 during travel. Sensitive and private information such as personal and banking information can be de-identified (i.e. made anonymous) and/or encrypted. Access to entity data in the database 142 can be restricted to those having approved credentials, which can be verified through authentication (e.g., username and password). The account can be updated by the using entity as the information changes over time.

Figure 15:
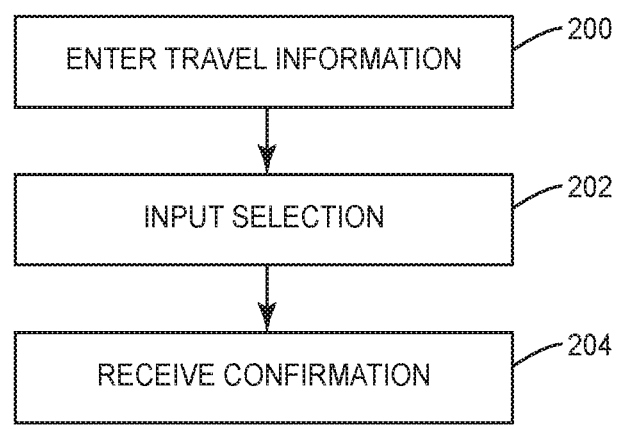
FIG. 15 is a flowchart diagram of a method of reserving transportation by a using entity.

FIG. 15 illustrates a method of a using entity making a reservation for transport using the system 10. The reservation can be made in a variety of different manners, including but not limited to accessing and using a website hosted by the server 140, through an application that is downloaded to an entity device 160, or by contacting a person working for supplying entity. The using entity inputs their travel information (block 200). This can include the dates and times of travel and the departing and destination locations. In one example, the using entity can also input travel preferences, such as mode of travel and whether they are acceptable to sharing a pod 20. In another example, this information is accessed from the using entity's account and it is not necessary for the using entity to provide this information again at this time.

Travel options are then presented to the using entity. This can include one or more options for completing the requested travel. For example, options can include different routes with different numbers of stops and vehicle changes during the travel, and different times for travel. The using entity then selects the desired travel options (block 202). The using entity receives a confirmation of their travel (block 204).

The using entity can view confirmed travel plans through their account. This can include accessing a dashboard page that includes information such as but not limited to upcoming travel, information about the travel, and previous travel. The using entity can also update their account information at necessary, change travel preferences, and various other tasks through the dashboard page.

The server 140 can calculate travel plans. These travel plans include but not limited to a starting location for the trip, an ending location for the trip, intermediate waypoints, a travel path that extends between the starting and ending locations, time of departure, and expected time of arrival. For air travel, the travel plan can also include trajectories of one or more of the flights. In one example, a travel plan is pre-established prior to receiving a request from a using entity. These travel plans can be based on historical information that indicates a demand for the travel between the starting and ending locations. For example, a travel plan can be pre-established for daily travel between Boston and San Francisco. Upon receiving a request from a travel, the server 140 accesses the status of the travel plans and provides the available options for the traveler. In another example, the server 140 establishes travel plans after receiving a request from a user. In one example, this occurs for travel between less-frequented travel destinations.

Figure 16:
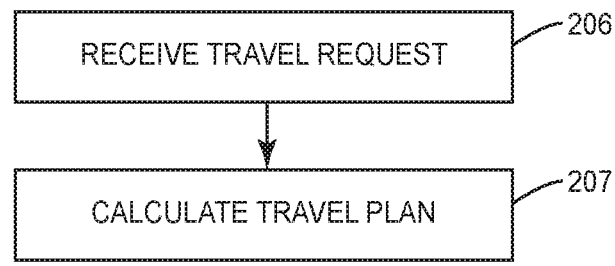
FIG. 16 is directed to a method of calculating one or more travel plans.

FIG. 16 illustrates a method performed by the server 140 in calculating a travel plan. The method includes the server 140 receiving a travel request (block 206). Based on the request, the server 140 calculates a travel plan (block 207). The travel plan can be one that is previously calculated by the server 140. Alternatively, the travel plan can be calculated after the server 140 receives the request. In one example, the server 140 calculates a single travel plan based on the request. In another example, the server 140 calculates two or more different travel plans that can be offered to the using entity.

The travel plans can be based on the capacity of the supplying entity to provide the pods 20 and/or vehicles 40 for the transportation. In one example, a single supplying entity provides both the pods 20 and vehicles 40. Other examples include different supplying entities that each supply one or more of the pods 20 and vehicles 40. The server 140 monitors the location and movement of the pods 20 and vehicles 40 in the system 10, as well as schedule future movements of the pods 20 and vehicles 40. The schedules of the movement of the pods 20 and vehicles 40 are continually updated as transportation plans are added for the system 10.

Figure 17:
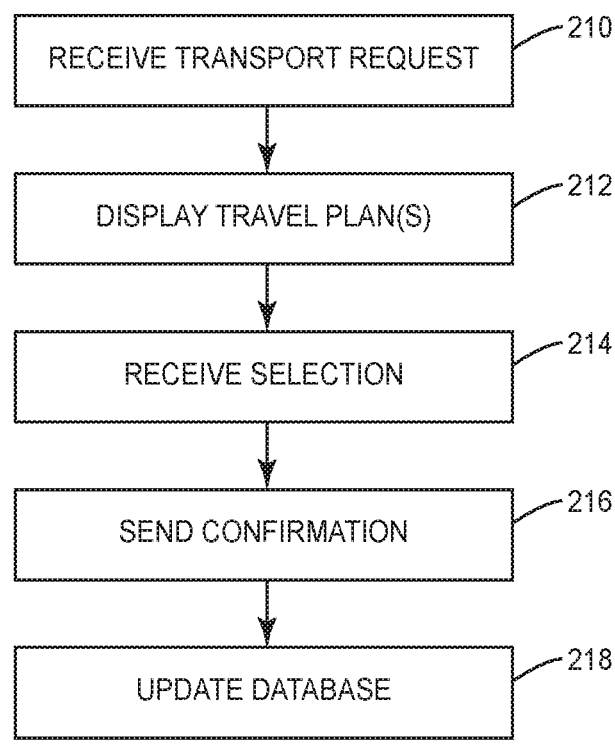
FIG. 17 is a flowchart diagram of a method of receiving and confirming transportation.

FIG. 17 illustrates a method of a server 140 scheduling transportation for a using entity. The method includes receiving a request for transportation from a using entity (block 210). The request can include transport for one or more persons and/or objects. In response to receiving the request, the server 140 accesses the relevant information from the database 142 and calculates one or more travel plans. The server 140 displays the available one or more travel plans (block 212). The travel plans can include different manners of traveling between the starting and ending point. This can include different travel routes using different types and/or numbers of vehicles 40. This can also include different options for the pod 20. One option includes the using entity having their own pod 20. Another option includes sharing a pod 20 with one or more other travelers and/or objects. For example, a using entity can share a pod 20 with other travelers who are traveling from a first city to a second city. The pod 20 can be shared during the entire transportation, or just during one or more legs of the transportation.

The options for the pod 20 can also be how the interior space 22 is arranged for the using entity. When having their own pod 20, the using entity can request their own personal requirements for the interior space 22. When traveling with other using entities, the options for the arrangement may be more limited or may not be able to be changed. Basic interior space 22 options can include dividing the interior space 22 into one or more separate sections such that the travelers have their own independent space, or the entire interior space 22 configured as a common space that is shared by the travelers.

The profile for the using entity can be accessed to calculate the one or more travel plans to offer relevant accommodations that meet the using entity's preferences. In one example, just the travel plans that meet the requirements of the using entity are displayed for selection. In another example, the travel plans that meet the requirements are displayed first, and the other less desired options are displayed second or in a secondary manner. For example, a first travel plan in which the using entity would have their own pod 20 is listed as a first option, and a second travel plan in which the pod 20 is shared with one or more other traveling entities is listed second.

After the one or more travel plans are displayed, the method includes receiving a selection from the using entity (block 214). A confirmation is sent to the using entity verify the details of the transportation (block 216). The server 140 updates the database 142 to include the information about the transportation (block 218). This ensures that the information about the system 10 remains updated to allow for accurate scheduling of additional travel.

The amount of information in the travel plan that is presented to the using entity can vary. For example, the using entity will be presented with the starting and ending locations, any intermediate waypoints, and an expected arrival time at the ending location. Other aspects that are calculated as part of the travel plan (e.g., speed of travel, trajectory) are not displayed. In another example, the entire travel plan is presented to the using entity to allow full disclosure to make a selection on the desired travel option.

Figure 18:
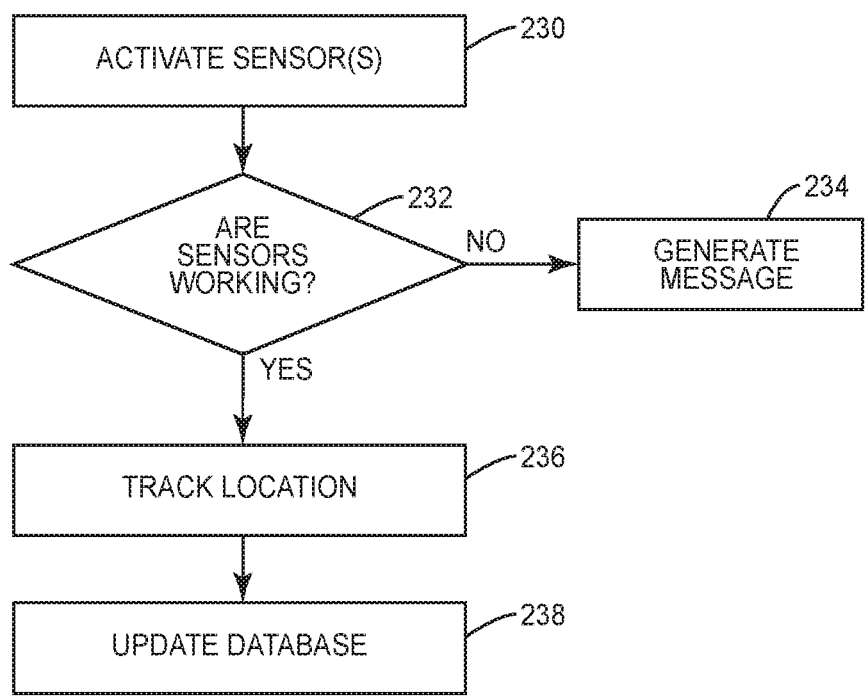
FIG. 18 is a flowchart diagram of a method of monitoring a pod while being transported by one or more vehicles.

FIG. 18 illustrates a method of monitoring the movement of the pods 20 during the transportation. The server 140 can monitor the location of the pods 20 through signals received through the one or more location sensors 115 on the pod 20 and/or sensors 126 on the vehicle 40 (block 230). In one example, the one or more location sensors 115, 126 are activated at the time of the transportation and are otherwise deactivated to save power. In another example, the one or more sensors 115, 126 remain activate while the pod 20 is in the system 10.

Prior to travel, the accuracy of the location sensors 115, 126 is tested (block 232). This ensures that the server 140 maintains an accurate location of the pod 20. In one example, the server 140 compares the location of the pod 20 determined through the location sensors 115 against the location of the attached vehicle 40 that is determined through sensors 126. In another example, the location of the pod 20 determined through the location sensor 115 is compared to the known fixed location of a disconnected pod 20. If the location is not accurate, a message is generated indicating the need for repair (block 234). The message may cause the pod 20 to be removed from service or may result in maintenance being performed on the pod 20 within the near future.

When the location tracking is accurate, the location of the pod 20 is monitored by the server 140 (block 236) as the pod 20 moves during the travel. The current location is maintained and can be maintained in the database (block 238). This allows for the server 140 to monitor the status of current transportation as travelers and/or objects are being moved between destinations.

Tracking the location can also include comparing the location of the pod 20 during the transportation against a known travel plan. For example, the flight plan for an aircraft vehicle 40 is calculated prior to departure. The server 140 can compare the current location of the pod 20 during the transport against the flight plan to determine whether the pod 20 is on schedule. In one example, the server 140 tracks a location of the pod 20 during transport and calculates an expected time of arrival. A using entity can access this information through their dashboard to monitor the status of the travel.

The server 140 can also calculate usage and efficiency information for the system 10. This can include the usage information for each pod 20 including but not limited to: the amount of time that the pod 20 is being used to transport travelers and/or objects; number of trips for the pod 20 within a given period of time; departure and arrival information for the pod 20; number of travelers and/or amount of cargo transported by the pod 20; seat usage; and cargo space usage. Based on this information, the server 140 can increase the efficiency of use for the pod 20. The using entity can also enter one or more names and contact addresses into their account. During the travel, the server 140 can access this information and send messages through the wireless network 170 informing the one or more persons about the status of the travel.

The server 140 can optimize the usage of the vehicles 40 by combining two or more pods 20 into a single travel plan. For example, upon receiving multiple requests for transportation between the same cities, the server 140 can assign a vehicle 40 to concurrently transport two or more pods 20. For example, the server 140 can schedule a vehicle 40 configured to transport multiple pods 20 (e.g., FIGS. 8 and 9). This optimizes usage of the vehicle 40 as a single vehicle 40 is able to transport two or more pods 20. In another example, multiple vehicles 40 can be arranged in a caravan to transport the multiple pods 20. This provides for a single travel plan to be calculated that is able to accommodate two or more separate pods 20.

Another optimization method is to transport two or more travelers within a single pod 20. The travelers can be required to confirm this arrangement prior to the server 140 confirming the travel plans. The confirmation of the arrangement can be obtained through the traveler's account that authorizes the multiple travelers per pod 20, or this option can be queried to and confirmed by the travelers at the time the transportation is confirmed.

Figure 19:
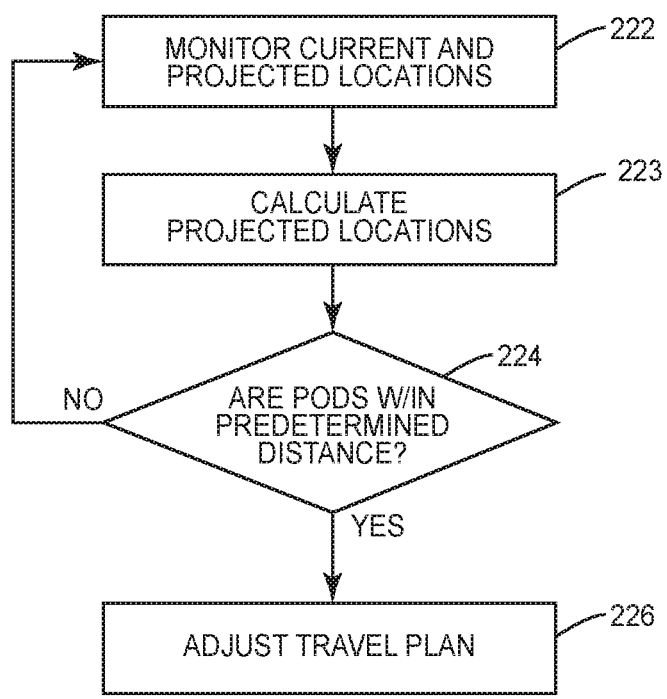
FIG. 19 is a flowchart diagram of a method of preventing collisions between pods during transportation.

During the travel, the server 140 is able to monitor the status of the pods 20 and prevent collisions. FIG. 19 illustrates a method of collision avoidance by the server 140. The server 140 monitors the present location of the pods 20 based on signals from one or more of the pods 20 and/or vehicles 40 (block 222). The signals can be periodically received from the pods 20 and/or vehicles 40. The server 140 can also query the pods 20 and/or vehicles 40 for location information.

The server 140 also calculates projected locations for the pods 20 (block 223). The projected locations can be calculated based on one or more of the current location, travel path, and expected speed of the pod 20.

The server 140 determines whether any pods 20 are expected to pass within a predetermined distance of each other (block 224). If there is no issue, the server 140 continues to monitor the travel of the pods 20. If two or more of the pods 20 are projected to be within a predetermined distance, the server 140 adjusts the travel plan of one or more of the pods 20 (block 226). This can include but is not limited to changing the travel path, adjusting the trajectories, and adjusting the speed of one or more of the vehicles 40. A message can further be sent to one or more of the vehicle operators and travelers about the adjustment.

As illustrated in FIG. 12, the server 140 can access other sources through the network 150 to obtain information to facilitate the transportation. These can include but are not limited sources 161, 162 that include maps and traffic. The maps can be used to calculate the travel plans and/or to be integrated with the travel plans to provide a visual guide that can be accessed by the travelers and/or vehicle operators. Traffic can include traffic that currently exists or that is scheduled to exist at some time during the travel. In one example, the server 140 can alter one or more travel plans based on traffic that is being experienced along the current travel path. The alterations can include but are not limited to different departure or arrival times, different waypoints along the travel path, different speed, and different trajectories.

Figure 20:
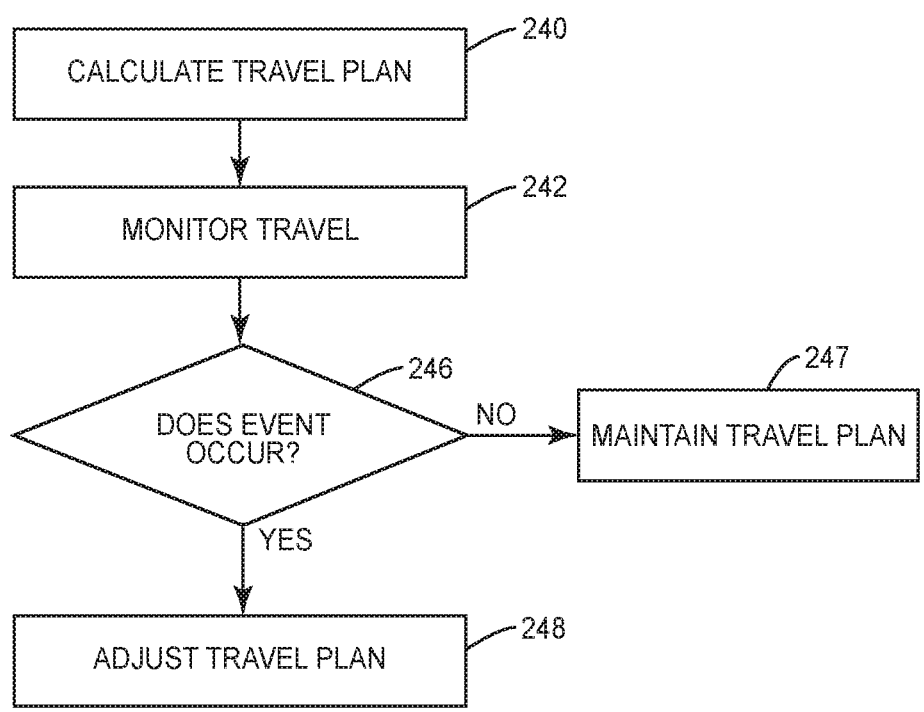
FIG. 20 is a flowchart diagram of a method of changing a travel plan due to the occurrence of an event.

FIG. 20 illustrates a method of adjusting a travel plan based on an event. A travel plan is initially calculated by the server 140 (block 240). A pod 20 is transported by a vehicle 40 in accordance with the travel plan and the server 140 monitors the position of the pod 20 during the travel (block 242). During travel, the server 140 monitors for events that could require a change in the travel plan (block 246). Events can include but are not limited to traffic and bad weather along the travel path. If no event occurs, the travel plan remains and the transportation according to the travel plan continues (block 247). If the server 140 determines an event, the server 140 adjusts the travel plan and transmits the change to the vehicle 40 to alter the travel plans (block 248).

As described above, a using entity can use a pod 20 for transportation of one or more persons and objects. The using entity is able to use the pod 20 during the time of the transportation. In another example, the using entity can rent or purchase the pod 20. The using entity can use the pod 20 in various different manners, including but not limited to as an office, apartment, and meeting space. When transportation is desired, the using entity can access the server 140 and schedule the transportation.

Figure 21:
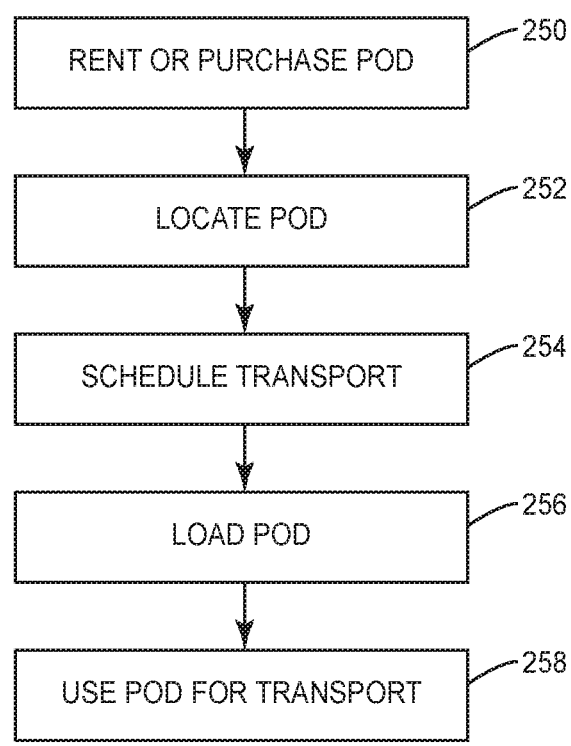
FIG. 21 is a flowchart diagram of a method of renting and using a pod by a using entity.

FIG. 21 includes a method of renting and/or owning a pod 20 and using the pod 20 for transportation. Initially, the pod 20 is rented or purchased by the using entity (block 250). The pod 20 is stored at a geographic location selected by the using entity (block 252). Because of the applicability of the pod 20 for a variety of use, the geographic location can vary. Examples include but are not limited to the using entity's office, home, job site, airport, port, and train station. The pod 20 can be used for various purposes, such as but not limited to office space, living quarters, and storage location.

The using entity schedules transportation of the pod 20 when needed (block 254). The request can include the location of the pod 20, and can include the identification of the one or more travelers and/or objects. At the time of travel, a vehicle 40 arrives at the location and connects to the pod 20. The pod 20 is then transported to the desired location using one or more of the vehicles 40.

In the various examples, the vehicles 40 can each be controlled by one or more persons. These persons are responsible for transporting the pods 20 between the various locations. In another example, one or more of the vehicles 40 are autonomous. The server 140 can control these vehicles 40 as they move between the various locations. The autonomous vehicles 40 can be configured to connect with the server 140 via a handshake to initiate communication and control. The handshake establishes a session in which the server 140 and vehicle 40 remain in communication and can exchange information. In one example, the vehicles 40 are established into the system 10 via a handshake with the server 140.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to monitor transportation of one or more persons, the system comprising:
   pods that each comprise exterior walls that extend around and form an interior space to house the one or more persons, the exterior walls comprising floor wall segments, roof wall segments, and side wall segments that are configured to connect together in multiple different configurations and form the interior space, the wall segments comprising one or more doors and one or more windows, the pods further comprising one or more partitions configured to be mounted to the wall segments in different locations to adjust a layout of the interior space;
   vehicles each configured to individually connect to one or more of the pods and to transport the pods from a first location to a second location, at least one of the vehicles configured to transport the pods by land and at least one of the vehicles configured to transport the pods by air; and
   a server located remotely from the pods and the vehicles, the server configured to receive data from the pods and the vehicles through a wireless communication network to monitor a usage and location of the pods, the server configured to monitor a number of the wall segments and the partitions for each of the pods and the configuration of the wall segments of the pods.

2. The system of claim 1, wherein the server is configured to receive a request from a person to configure one of the pods in a selected one of the configurations.

3. The system of claim 1, wherein a first one of the vehicles comprises wheels that are driven by an engine or propulsion system to transport the pod over land, and a second one of the vehicles comprises an aircraft engine and wings to transport the pod through the air.

4. The system of claim 1, wherein the server comprises:
   a communication interface configured to receive the data from the pods and the vehicles transmitted through the wireless communication network;
   a memory circuit configured to store information about the pods; and
   a processing circuit configured to monitor the usage and location of the pods.

5. The system of claim 4, wherein the server calculates an expected time of arrival to a destination location for the pods that are being transported by one of the vehicles.

6. The system of claim 4, wherein the server is configured to calculate a travel plan for each of the pods that each comprises a travel path that extends between the first and second locations, the travel plan being calculated prior to departure from the first location.

7. The system of claim 6, wherein the server is configured to:
   monitor the movement of the pods along the travel paths; and
   adjust the travel plan of one or more of the pods when the monitor server calculates that two or more of the pods are scheduled to pass within a predetermined distance of each other.

8. The system of claim 1, wherein each of the pods further comprises:
   one or more sensors that detect a geographic location of the pod; and
   a communications circuit that enables wireless communications for the one or more persons in the interior space;
   wherein the communications circuit is configured to wirelessly transmit the location of the pod to the server.

9. A method of transporting one or more persons, the method comprising:
   monitoring a location of pods that each comprise wall segments that mount together to form an interior space to house the one or more persons, the wall segments comprising one or more doors configured to provide access into and out of the interior space, the wall segments being modular and configured to connect together in a variety of different configurations to selectively configure the interior space;
   monitoring the configurations of the pods;
   monitoring a location of vehicles each configured to individually connect to one or more of the pods and to transport the pods;
   receiving a request to transport a pod that is located at a home of a first one of the persons to a remote second location, the request further comprising a selection of one of the configurations for the interior space of the pod;
   scheduling a first one of the vehicles to transport the pod while in the selected one of the configurations from the home of the first one of the persons to an intermediate location when the first one of the persons is within the pod;

scheduling a second one of the vehicles to transport the pod from the intermediate location to the second location when the first one of the persons is within the pod; and during transportation of the pods, sending and receiving communications with the one or more persons that are in the interior space of the pod.

10. The method of claim 9, further comprising arranging the interior space into two or more separate rooms.

11. The method of claim 9, further comprising:
calculating a travel path for the one of the pods that extends between the first location, the intermediate location, and the second location, the travel path being calculated prior to departure from the first location;
monitoring a location of the pod during the travel;
determining an event related to the travel path while the pod is being transported between the first and second locations; and
in response to determining the event, adjusting the travel path of the one of the pods.

12. The method of claim 11, wherein determining the event related to the travel path comprises determining traffic along the travel path and adjusting the travel path in response to the traffic.

13. The method of claim 9, further comprising:
calculating a travel path for the one of the pods that extends between the first location, the intermediate location, and the second location; and
accessing a map through a wireless communication network and integrating the travel path with the map.

14. The method of claim 9, further comprising:
receiving a request to transport a second one of the persons from the first location to the second location;
assigning the pod to transport the second one of the persons; and
concurrently transporting both the first and second ones of the persons in the pod from the first location to the second location.

15. The method of claim 9, further comprising updating a database that includes current and future movements of the pods and the vehicles prior to assigning the pod to transport the second one of the persons.

16. The method of claim 9, further comprising using a first mode of transportation to transport the pod from the first location to the intermediate location and using a different second mode of transportation to transport the pod from the intermediate location to the second location.

17. The method of claim 9, further comprising:
calculating a travel plan that includes a travel path from the first location to the second location prior to the pod departing from the first location;
monitoring a position of the pod during the travel and comparing the position with the travel path; and
notifying a remote entity when a difference between the position and the travel path exceeds a predetermined amount.

18. A method of transporting one or more persons, the method comprising:
positioning the pod at a home or business of a traveler, the pod comprising:
one or more floor wall segments, roof wall segments, and lateral sidewall segments configured together in multiple different configurations to form an interior space;
one or more partitions mountable within the interior space at different locations to form different sections, at least one of the one or more partitions comprising a door configured to allow the one or more persons to move between the different sections of the interior space while the pod is being transported by the vehicles;
receiving a request for transportation in the pod, the request further comprising a selected one of the configurations of the interior space and position of the one or more partitions;
scheduling transportation of the pod from the home or business to a destination;
dispatching a first vehicle to the home or business;
after the traveler is positioned in the pod, connecting the pod to a land-based vehicle while the traveler is positioned in the pod;
moving the pod with the land-based vehicle along roads from the home or business to an airport while the traveler is positioned in the pod;
disconnecting the pod from the land-based vehicle at the airport while the traveler is positioned in the pod;
connecting the pod to an aircraft at the airport while the traveler is positioned in the pod;
flying the pod with the aircraft from the airport to the destination while the traveler is positioned in the pod; and
disconnecting the pod from the aircraft at the destination while the traveler is positioned in the pod.

19. The method of claim 18, wherein scheduling the transportation of the pod comprises receiving identification information of the traveler.

20. The method of claim 18, further comprising selling the pod to the traveler prior to positioning the pod at the home or business.

* * * * *